(Model.)

J. C. RODMAN.
MINNOW BUCKET.

No. 247,690. Patented Sept. 27, 1881.

Witnesses:
J. M. George.
DeWitt C. Goodrich

Inventor:
John C. Rodman.

UNITED STATES PATENT OFFICE.

JOHN C. RODMAN, OF PAOLA, KANSAS.

MINNOW-BUCKET.

SPECIFICATION forming part of Letters Patent No. 247,690, dated September 27, 1881.

Application filed April 20, 1881. (Model.)

*To all whom it may concern:*

Be it known that I, JNO. C. RODMAN, of Paola, in the county of Miami and State of Kansas, have invented a new and useful Improvement in Minnow-Buckets, of which the following is a specification, reference being had to the accompanying drawings, forming a part hereof, and in which—

Figure 1:
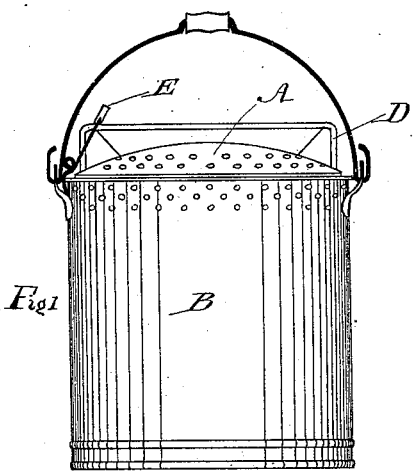
Figure 2:
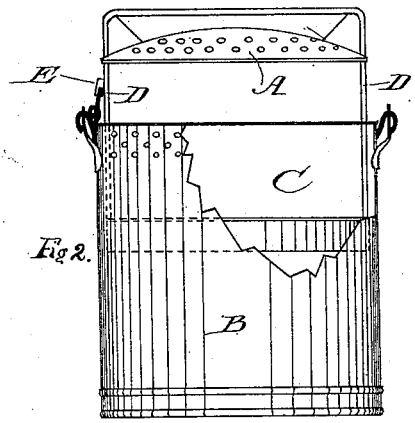

Figure 1 is a side elevation of the bucket closed. Fig. 2 is the same opened, with a section broken away to show an inner view.

Like letters of reference indicate like parts.

My invention consists in a novel arrangement and combination of parts, as will be hereinafter described, and then pointed out in the claim.

In Fig. 1 B represents the body of the bucket proper, and A the perforated lid, which opens upward by means of the slides D D. These slides pass downward through guide-holes punched through a horizontal flange soldered to the top of the bucket, the lower ends of which are secured to the inner pan, C. (Shown in Fig. 2.) These slides D D are made from one piece of wire, bent in the form of an inverted U, the upper end of which forms a handle, by which to raise the lid A or close the same.

E represents a spring-catch soldered to the top edge of the bucket in such a manner as to engage over the corner formed by the slide D, thus automatically locking the lid or holding said lid in any position when open, as shown in Fig. 2.

In Fig. 2 the lid A is shown raised or opened. A section of the bucket is broken away, so as to expose to view the movable pan C. This pan is secured to the lower ends of the two slides D D and moves up and down with said slides and top A. It is provided with a perforated bottom to admit of the free passage of water while lowering or raising same.

The object of my invention is as follows: first, to provide a movable perforated lid covering the whole of the top of the bucket, thus giving plenty of room for the insertion of the hand into the movable pan holding the minnows; second, to provide the lid A with an automatically-working catch, thus preventing the accidental escape of the fish.

Having thus described my invention, what I claim as new, and desire to secure by Letters Patent, is—

The movable top A and the bucket B, provided with the spring-catch E, to engage with the slide D, in combination with the slides D D and the movable pan C, all substantially as shown and described, and for the purpose as set forth.

JOHN C. RODMAN.

Witnesses:
DEWITT C. GOODRICH,
HENRY LOHNER.